Dec. 10, 1963
J. B. GRIFFO
3,113,756
REGULATOR
Filed May 8, 1961
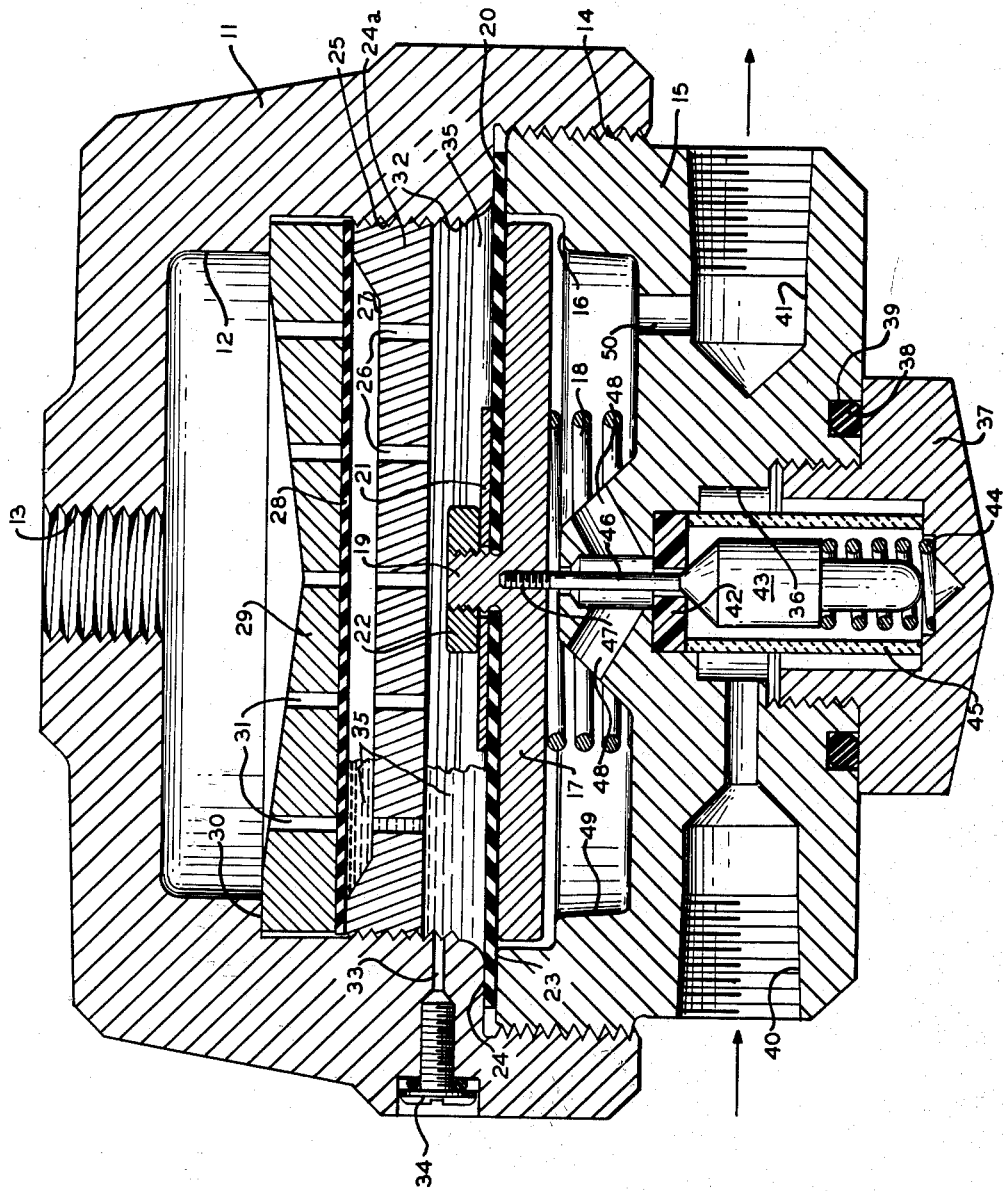
INVENTOR.
Joseph B. Griffo
BY
Norman N. Popper
ATTORNEY 3,113,756
REGULATOR
Joseph B. Griffo, Garfield, N.J., assignor to Lincoln Tool
and Machine Co., Inc., Garfield, N.J.
Filed May 8, 1961, Ser. No. 108,430
2 Claims. (Cl. 251—57)

My invention relates generally to regulators and specifically to regulators of the dome-loaded type.

It is among the objects of my invention to provide a regulator which cuts off the supply of material which it regulates when a fault occurs in the regulator.

Yet another object of my invention is to provide a regulator which is responsive to fluid pressures and blocks the passage of the regulated material upon failure of its parts.

A still further object of my invention is to provide a regulator which is easily disassembled and repaired, is simple in form, and is durable.

A still further object of my invention is to provide a pair of fluid coupled members which are uncoupled upon the failure of the regulator by leakage.

Among the still further objects of my invention is to provide a regulator in which the control members are not rigidly coupled to each other but are solely fluid coupled by a fluid medium entrapped between them.

These objects and advantages as well as other objects and advantages are achieved by the device shown in the FIGURE which is a vertical sectional view of a regulator illustrative of my invention.

The delivery of toxic, caustic, or inflammable fluids is controlled by valves generally designated as regulators. In the event of a failure of the component parts of the valve or its sticking, or of any other malfunction, the dangerous fluid is uncontrolled and may cause severe damage to life or property. The present regulator is one which is normally closed, and which opens upon the application of fluid pressure to a diaphragm. This diaphragm is not rigidly coupled to another diaphragm but is fluid coupled by a liquid entrapped between the two diaphragms. The second diaphragm is connected to a valve plug. Upon the failure of either of the diaphragms the fluid coupling entrapped between them may escape, the diaphragms are no longer coupled with each other, so that a spring may seat the plug connected to the second diaphragm in closing relationship with the inlet and outlet portions of the regulator to prohibit the further passage of the dangerous fluids after the failure of the diaphragms.

Referring now to the drawing in detail:

My regulator provides a housing 11 which has a diaphragm chamber 12 therein. The housing is preferably of metal, such as steel. The chamber 12 is provided with a threaded intake port 13 at the top which is threaded for convenient attachment of a conduit. The bottom 14 of the housing 11 is open and provided with an internal thread. A closure or housing cap 15 is provided. It has top external threads and engages with the bottom 14 to close the chamber 12 at the bottom. The closure 15 has a top deep recess which has an annular internal flange 16. This flange 16 defines a space for a bottom diaphragm plate 17. A spring 18 is seated on the bottom of the deep recess in the closure 15 and normally urges the diaphragm plate 17 upwardly away from the flange 16. The bottom diaphragm plate 17 has a generally central enlargement 19. This enlargement is passed through a hole in a diaphragm 20. A top diaphragm plate 21 is carried by the enlargement 19 and rests on top of the diaphragm 20. A nut 22 secures together the diaphragm plates 17, 21 and the diaphragm 20. The diaphragm plate 20 extends over the end 23 of the closure member and is gripped between that end 23 and an internal generally rigid flange 24 in the housing 11.

In the housing 11, in spaced relation from the diaphragm 20, there is a circular threaded plate 24a engaged with the internally threaded inside wall 25 of the housing 11. This plate 24a is provided with passages 26 and a depression 27 in the top thereof. Seated upon the top edge of this plate 24a is a second diaphragm 28; lying over the diaphragm 28, there is an upper or limiter plate 29 seated upon an internal flange 30 in the chamber 12. The upper plate is provided with passages 31. The lower plate 24a and the upper plate 29 are tightly engaged with the diaphragm 28 against the passage of either gases or fluids around the diaphragm 28.

The space 32 between the diaphragms 28, 20 has an inlet passage 33 which is sealed by a threaded plug 34. Through the passage 33; oil may be introduced into the chamber 32 between the diaphragms 20, 28. Other fluids, preferably inert, may also be used. The presence of oil 35 has the effect of coupling the diaphragms 20, 28 together so that diaphragm 20 will be responsive to the deformation of the diaphragm 28, in response to gas introduced into the top of the chamber 12 through the intake port 13. Leakage of the oil 35 by reason of a fault in either of the diaphragms 20, 28 will have the effect of uncoupling the diaphragms 20, 28, from each other; such failure of the diaphragms 20, 28 will render the system inoperative because of the valve hereinafter described.

The closure 15 is provided with an internal valve chamber 36 which is open at one end, where a cap 37 is applied. A sealing ring 38 is positioned in a channel 39 in the bottom of the closure 15. The cap 37 engages the sealing ring 38 to seal the valve chamber. The valve chamber 36 is provided with an intake port 40 and an outlet port 41. The intake port communicates with the valve chamber 36. The top of the valve chamber 36 is provided with a valve seat 42. In the valve chamber 36, there is a valve or plug 43 which engages the seat 42 and blocks the passage of material through the valve. A spring 44 normally urges the valve 43 into seated engagement upon the seat 42. A cylindrical filter 45 surrounds the valve plug 43. The top of the valve plug 43 is provided with a valve stem 46. The valve stem extends upwardly through a passage in the closure 15, and engages the lower diaphragm plate 17 by reason of its threaded end 47 engaged with a threaded passage in the lower plate 17. When the plug 43 is unseated, material may pass into the passages 48 and into the lower chamber 49, so that pressure may be exerted upon the diaphragm 20, normally urging it to the position shown in the FIGURE, wherein the plug 43 is seated on the seat 42, and the passage of material through the valve is blocked. Gaseous material (or other material) in the chamber 49 is vented from the chamber 49 through the passage 50, and through the outlet 41. The operation of the fail-safe valve is as follows:

The plug 43 is normally seated on the seat 42 and no material may pass from the inlet 40 and out of the outlet 41 by reason of the spring 44 which seats the plug 43 in closing relationship to those passages 40, 41. When fluid pressure is introduced through the passage 13 upon the top of the diaphragm 28, that diaphragm 28 deforms downwardly and tends to compress the oil or other fluid 35 in the chamber between the two diaphragms 20, 28. The diaphragm 28 deforms downwardly into the concave portion 27 in the support plate 24a. Since the oil 35 or other fluid material is relatively uncompressible under the pressure exerted in the system, it will cause the diaphragm 20 to deform downwardly. This deformation of the diaphragm 20 will move the valve stem 46 to unseat the plug 43, thereby unblocking the main valve passage and permitting the passage of material from the inlet 40 and out of the outlet 41. Upon the reduction of pressure introduced through the passage 13, the upper diaphragm 28 will return to normal position shown in the figure, relieving the pressure exerted upon the oil 35, and thereby causing the spring 18 to restore the diaphragm 20 to normal position. This results in the reseating of the plug 43, closing the passage in the valve. This type of valve is ideal for the control of dangerous, poisonous, or flammable materials, for in the event that a leak should occur in either of the diaphragms, for any reason such as the breakage of the diaphragm 20, 28 is broken by the leakage of oil from the space between the diaphragms. When this occurs, the spring 18 has no resistance to overcome, and urges the valve 43 into engagement with the seat 42, since the spring 18 restores the diaphragm 20 to normal position. Thus, the escape of the dangerous material controlled by the valve is avoided when the valve fails.

The filter 45 may be of the fibrous or ceramic type. The housing 11, the closure 15 and the cap 37 are preferably of metal. The diaphragm supports and plates 29, 24a, 21, 17 are preferably of metal. The diaphragms 20, 28 are preferably formed of a flexible, tough, inert plastic material. The fluid 35 may be water or oil, provided, however, that if it is oil, it shall not be so viscous as greatly to delay the response of the diaphragms to the movement of the other corresponding diaphragm. The seat 42 may be formed of a tough inert plastic material. The valve plug 43 is preferably metal.

The actuation of the top diaphragm 28 by gaseous material is not critical since the diaphragm may be actuated by numerous recognized substitutes, such as fluids, adjustable springs, or even a system of levers. It is also to be noted that the top diaphragm 28 may be substituted for by well known equivalent structures that would perform the same function i.e. a piston operated by an adjustable spring, or a lever. An outstanding feature of the invention is the coupling between the two diaphragms which is a fluid 35 but the diaphragms 20, 28 may be substituted for by other movable members, and the driving force may be substituted for by other driving forces.

The foregoing description is merely intended to illustrate an embodiment of the invention. The component parts have been shown and described. They each may have substitutes which may perform a substantially similar function; each substitute may be known as a proper substitute for the said components and may have actually been known or invented before the present invention; these substitutes are contemplated as being within the scope of the appended claims, although they are not specifically catalogued herein.

What is claimed:
1. A regulator comprising,
   a housing with an intake port therein,
   a first annular seat in the housing,
   a first perforate plate seated on the housing,
   a first diaphragm across the bottom of the first perforate plate,
   a second perforate plate in threaded engagement with the inside wall of the housing and sealing the first diaphragm to the first perforate plate,
   a second annular seat in the housing,
   a second diaphragm positioned on the second annular seat in the housing,
   a top plate on the second diaphragm,
   a bottom plate below the diaphragm and extending through the second diaphragm and top plate,
   a means to attach the top and bottom plates and the second diaphragm together,
   a closure in threaded engagement with the inside wall of the housing and sealing the second diaphragm to the housing,
   a fluid confined in the hermetic chamber in the housing defined by the first and second diaphragms,
   a first spring seated on the closure and engaged with the bottom plate and normally urging the second diaphragm toward the first diaphragm,
   the closure having a valve chamber therein and inlet and outlet passages communicating with the valve chamber,
   a cap in threaded engagement with the closure to enclose the valve chamber,
   a plug normally seated in the valve chamber,
   a second spring in the valve chamber engaged with the plug and normally urging it to block the valve chamber,
   a valve stem connected to the second diaphragm and to the plug.
2. A regulator comprising,
   a housing with an intake port therein,
   a first annular seat in the housing,
   a first perforate plate seated on the housing,
   a first diaphragm across the bottom of the first perforate plate,
   a second perforate plate in threaded engagement with the inside wall of the housing and sealing the first diaphragm to the first perforate plate,
   a second annular seat in the housing,
   a second diaphragm positioned on the second annular seat in the housing,
   a top plate on the second diaphragm,
   a bottom plate below the diaphragm and extending through the second diaphragm and top plate,
   a means to attach the top and bottom plates and the second diaphragm together,
   a closure in threaded engagement with the inside wall of the housing and sealing the second diaphragm to the housing,
   a fluid confined in the hermetic chamber in the housing defined by the first and second diaphragms,
   a first spring seated on the closure and engaged with the bottom plate and normally urging the second diaphragm toward the first diaphragm,
   the closure having a valve chamber therein and inlet and outlet passages communicating with the valve chamber,
   a cap in threaded engagement with the closure to enclose the valve chamber,
   a plug normally seated in the valve chamber,
   a second spring in the valve chamber engaged with the plug and normally urging it to block the valve chamber,
   a valve stem connected to the second diaphragm and to the plug,
   the first diaphragm deformable by pressure exerted through the intake port in the housing to compress the fluid in the hermetic chamber, the second diaphragm deformable in response to the fluid in the hermetic chamber, the plug unseatable when the second diaphragm overcomes the first and second springs whereby fluid may traverse the valve chamber.

References Cited in the file of this patent
UNITED STATES PATENTS

| | | |
|---|---|---|
| 2,245,485 | Lewis | June 10, 1941 |
| 2,320,886 | Quiroz | June 1, 1943 |
| 2,858,840 | Wright | Nov. 4, 1958 |
| 2,941,543 | Klexzek | June 21, 1960 |
| 3,058,482 | Nesselbush | Oct. 16, 1962 |